US012668535B2

(12) United States Patent
Mocsari et al.

(10) Patent No.: US 12,668,535 B2
(45) Date of Patent: Jun. 30, 2026

(54) APPARATUS AND PROCESS FOR CALCINING FEED MATERIAL

(71) Applicant: Air Products and Chemicals, Inc., Allentown, PA (US)

(72) Inventors: Jeffrey Carl Mocsari, Hamilton, NY (US); Anandkumar Makwana, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 672 days.

(21) Appl. No.: 18/079,203

(22) Filed: Dec. 12, 2022

(65) Prior Publication Data

US 2024/0190762 A1 Jun. 13, 2024

(51) Int. Cl.
| | |
|---|---|
| *F23D 14/22* | (2006.01) |
| *C04B 2/08* | (2006.01) |
| *C04B 2/10* | (2006.01) |
| *F27B 15/12* | (2006.01) |
| *F27B 15/16* | (2006.01) |

(52) U.S. Cl.
CPC ................. *C04B 2/08* (2013.01); *C04B 2/10* (2013.01); *F23D 14/22* (2013.01); *F27B 15/12* (2013.01); *F27B 15/16* (2013.01); *F27M 2003/03* (2013.01)

(58) Field of Classification Search
CPC . F27B 15/12; F27B 15/16; C04B 2/08; C04B 2/10; F23D 91/00; F23D 1/005
See application file for complete search history.

(56) References Cited

U.S. PATENT DOCUMENTS

| | | | |
|---|---|---|---|
| 4,059,393 A | 11/1977 | Kobayashi | |
| 4,568,276 A | 2/1986 | Fujisawa | |
| 5,714,113 A * | 2/1998 | Gitman | F27D 99/0033 |
| | | | 432/13 |
| 9,296,621 B2 | 3/2016 | Feng et al. | |
| 9,533,892 B2 | 1/2017 | Baker et al. | |
| 9,573,847 B2 | 2/2017 | Prokesch | |
| 10,099,928 B2 | 10/2018 | Tse et al. | |

(Continued)

FOREIGN PATENT DOCUMENTS

| | | | |
|---|---|---|---|
| CA | 2844567 | 5/2018 | |
| CN | 101293744 A * | 10/2008 | C04B 7/4438 |
| CN | 102032565 B * | 7/2012 | |

(Continued)

*Primary Examiner* — Gregory A Wilson

(74) *Attorney, Agent, or Firm* — Jason M. Ploeger

(57) ABSTRACT

A process for calcining a feed material can include passing a solid particulate material through a burner or adjacent a burner for being pass through a flame formed by the burner to facilitate calcination of the material. The material can be emitted from the flame of the burner within a calciner for passing through a body of the calciner to an outlet for further calcination of the material so the material has a pre-selected residence time as it is passed through the flame and calciner to an outlet. The residence time can be 20 seconds to 30 seconds, 1-3 minutes, less than 5 minutes in some embodiments. Some embodiments can facilitate calcination of a $CaCO_3$ material so the calcined solid material output from a calciner is comprised of $Ca(OH)_2$ (e.g. is mostly $Ca(OH)_2$, is over 90 weight percent $Ca(OH)_2$, etc.).

17 Claims, 12 Drawing Sheets

(56)  References Cited

U.S. PATENT DOCUMENTS

2022/0024818  A1 *   1/2022   Nagra ....................... F27B 1/02

FOREIGN PATENT DOCUMENTS

| CN | 103486849 | A | * | 1/2014 | | |
|----|-----------|---|---|--------|---|---|
| CN | 105782968 | A | * | 7/2016 | | |
| CN | 107300317 | A | * | 10/2017 | | |
| CN | 108164161 | | | 6/2018 | | |
| CN | 115127358 | A | * | 9/2022 | | |
| DE | 2550384 | | | 5/1977 | | |
| DE | 102005046198 | A1 | * | 3/2007 | ............. | C22C 19/07 |
| EP | 0369117 | A2 | * | 5/1990 | ............. | C01B 13/34 |
| EP | 1515925 | | | 3/2005 | | |
| JP | 2001141236 | A | * | 5/2001 | ............. | F23D 14/22 |
| KR | 20070086406 | A | * | 8/2007 | | |
| WO | WO-9520544 | A1 | * | 8/1995 | ............. | C03B 3/026 |

* cited by examiner

APPARATUS AND PROCESS FOR CALCINING FEED MATERIAL

FIELD

The present innovation relates to processes for calcining a feed material, apparatuses for calcining a feed material (e.g., calciners, burners for calcination, calcination systems, etc.), operational aspects of the apparatuses, and methods of making and using the same.

BACKGROUND

Calciners can be used to calcine a raw material. Often, the calciner is structured as a long pipe or cylinder that is configured to facilitate heating of a calcium carbonate ($CaCO_3$) material to form calcium oxide (CaO), which can also be referred to as lime or quicklime. Operation of the calciner also often results in emission of carbon dioxide ($CO_2$). Calciners are often designed to provide long residence times to form CaO. Water may then be exposed to the CaO to form slaked lime, or hydrated lime, ($Ca(OH)_2$) in a separate operational step downstream of the calciner.

SUMMARY

We determined that there is a need to provide improved calciner operations that can permit smaller residence times for calcination that can also provide significant improvements in operational efficiency and carbon dioxide capture from exhaust gas (or flue gas) output from the calcination process. We also determined that it would be advantageous to provide a calcination apparatus and process that could be operated to form hydrated lime ($Ca(OH)_2$) from a feed material comprising $CaCO_3$ so that an additional process step involving hydration of lime (CaO) could be avoided. The formed hydrated lime can be a partial formation of hydrated lime (e.g. over 5% of the feed material is calcined into hydrated lime, calcination of the feed material occurs so that the greater than 1% of the feed material is calcined into hydrated lime and less than 100% of the feed material is calcined into hydrated lime, etc.), a substantial formation of hydrated lime (e.g. over 70% of the feed material is calcined into hydrated lime, over 60% of the feed material is calcined into hydrated lime, etc.), or a substantially complete formation of hydrated lime (e.g. over 90% of the feed is calcined into hydrated lime).

Embodiments of a process for calcining a feed material we have developed can include passing a solid particulate material that includes CaCO3 through a burner or adjacent a burner (e.g. near a flame emitted from a burner via a lance, etc.) for being passed through a flame formed by the burner to facilitate calcination of the material. The material can be emitted from the flame of the burner within a calciner for passing through a body of the calciner to an outlet for further calcination of the material so the material has a pre-selected residence time as it is passed through the flame and calciner to an outlet and/or inlet of a filtration device. The residence time can be 20 seconds to 30 seconds, 1-2 minutes, or less than 3 minutes in some embodiments. Embodiments can facilitate calcination of a CaCO3 material so the material output from the calciner is comprised of Ca(OH)2 (e.g. is mostly Ca(OH)2, is over 50 weight percent (wt %) Ca(OH) 2, is over 90 wt % Ca(OH)2, etc.) while providing an output exhaust having a high amount and/or concentration of carbon dioxide (CO2) to facilitate CO2 capture. In embodiments where the oxidizer is comprised of mostly oxygen, the increase in CO2 concentration and/or higher amount of CO2 can be obtained because substantially less nitrogen (N2) can be used in embodiments (e.g. embodiments configured to use oxy-fuel systems, high oxygen concentration oxidizers, etc.).

Embodiments can utilize one or more filter mechanisms for filtration of the solid particulates having the calcined material (e.g. material that is mostly Ca(OH)2 or CaO etc.) from the exhaust gas before the exhaust gas is passed through a carbon capture system. Other embodiments may not need to utilize a filter mechanism. For example, some embodiments can be incorporated in an arc furnace arrangement or cement manufacturing facility so that the calcined material can be output to a rotary kiln for cement manufacturing without filtration or can be fed to slag for slag treatment without filtration being needed.

Embodiments can be configured for use with dry feed material or a wet feed material. In embodiments that may utilize a wet feed material, the feed material can be passed through at least one dryer to dry the feed material prior to the feed material being fed to a calciner and/or injecting into a flame formed in a calciner.

Embodiments can utilize a burner for formation of a flame within the calciner that can provide a high calcination temperature for material fed through the flame. An oxidizer having an oxygen content of between 21 volume percent (vol %) to 100 vol % oxygen can be utilized by the burner for formation of the flame within the calciner, for example. For example, the oxygen content of the oxidizer utilized in the burner can be in the range of 21 vol % to 100 vol %, 30 vol % to 70 vol %, 35 vol % to 60 vol %, or other suitable range of oxygen content (e.g. between 95 vol % oxygen to 100 vol % oxygen, between 90 vol % oxygen and 100 vol % oxygen, between 95 vol % oxygen and 99.99 vol % oxygen, etc.). The oxidizer can be any suitable oxidizer. For instance, the oxidizer can include air, oxygen enriched air, and/or oxygen gas flows, for example.

The burner can utilize a fuel for combustion to form the flame. The fuel can include natural gas, diesel, pulverized coal, hydrogen or other suitable fuel source.

The filter mechanism (when utilized) can include one or more cyclones and/or one or more bag house filters. The filter mechanism can also, or alternatively, include other filter mechanisms suitable for removing the solid particulate calcined material output from the calciner from hot exhaust gas output from the calciner prior to the exhaust gas undergoing carbon capture.

We have determined that embodiments of our apparatus and process can permit low residence time calcination to occur. This can permit sizing of calcination systems to be substantially reduced as the size and length of a calciner and related equipment can be substantially reduced due to the significantly lower residence times. Such features can provide significant capital cost reductions as well as reductions in operational costs and maintenance costs.

Further, we have determined that embodiments can be adapted to provide a higher efficiency calcination that can provide calcining a feed material that includes CaCO3 (e.g. a limestone material, etc.) to solid particulates comprising mostly Ca(OH)2. This type of calcination operation can avoid having to hydrate lime (CaO) to form such material by exposing CaO to water in a separation operational step. This type of operation can provide substantial operational flexibility and further improved operational performance to provide significant improvements in operational efficiency.

We have determined that embodiments can also provide a higher concentration of CO2, or a higher relative flow rate of CO2 in exhaust gas output from a calciner, which can provide improved carbon capture for the capture of CO2 (e.g. as a product gas from operations etc.). The improvement can include an improved higher concentration of CO2 that is captured (e.g. a higher CO2 capture rate) and/or a higher concentration of CO2 in the gas that is output from the calciner with the calcined material. This can provide a further improvement in operational efficiency, e.g. for embodiments adapted to provide CO2 as a product from operation of the calcining of the material, etc.

In a first aspect, a process for calcining a feed material is provided. The process can include feeding solid particulate material to a flame formed in a calciner so the solid particulate material passes through the flame as the solid particulate material moves through the calciner to an outlet of the calciner.

In a second aspect, the solid particulate material can have a residence time for calcination of between 5 minutes and 5 seconds, between 3 minutes and 5 seconds, between 10 seconds and 30 seconds, or between 5 seconds and 1 minute.

In a third aspect, the feeding of the solid particulate material to the flame can include passing the solid particulate material into a burner for feeding into the calciner via the burner and/or passing the solid particulate material into the calciner adjacent to the flame so that the solid particulate material passes through the flame. In some embodiments, all the solid particulate material can be fed into a burner for feeding into the calciner via the burner so the particulate material is fed into the flame via the burner. Other embodiment can be configured so that all the solid particular material can be fed into the calciner adjacent to the flame so that the solid particulate material passes through the flame (e.g. via at least one lance feed, etc.). In yet other embodiments, some solid particulate material can be fed into a burner for feeding into the calciner via the burner so the particulate material is fed into the flame via the burner and other solid particulate material can be fed into the calciner adjacent to the flame so that the solid particulate material passes through the flame (e.g. via at least one lance feed, etc.).

In a fourth aspect, the process can also include feeding a fuel and at least one flow of oxidant to the burner for formation of the flame in the calciner.

In a fifth aspect, the flame formed in the calciner via at least one burner can be configured to facilitate calcination of the solid particulate material at a pre-selected calcination temperature range of between 815° C. and 2,205° C., between 815° C. and 1,370° C., between 815° C. and 1,650° C., between 925° C. and 1,650° C. or between 925° C. and 1,370° C.

In a sixth aspect, the calcined material can comprise between 70 weight percent (wt %) Ca(OH)$_2$ and 100 wt % Ca(OH)$_2$, between 80 wt % Ca(OH)$_2$ and 100 wt % Ca(OH)$_2$, or between 90 wt % Ca(OH)$_2$ and 100 wt % Ca(OH)$_2$ or can include calciner output concentrations of CaO, and Ca(OH)$_2$. In yet other embodiments, the calcined material can comprise over 50 wt % Mg(OH)$_2$, over 75 wt % Mg(OH)$_2$ over 90 wt % Mg(OH)$_2$ or over 95 wt % Mg(OH)$_2$ or between 90 wt % Mg(OH)$_2$ and 100 wt % Mg(OH)$_2$ (e.g. 95 wt % Mg(OH)$_2$ to 98 wt % Mg(OH)$_2$. In yet other embodiments, the calcined material can include calciner output concentrations of calcined material that include concentrations of MgO and Mg(OH)$_2$. For example, in some embodiments, the calcined material can include calciner output concentrations of calcined material that include concentrations of over 20 wt % Mg(OH)$_2$ and over 50 wt % Ca(OH)$_2$, between 5 wt % Mg(OH)$_2$ and 30 wt %

Mg(OH)$_2$ and between 70 wt % Ca(OH)$_2$, and 95 wt % Ca(OH)$_2$, or can be another suitable composition having calciner output concentrations of Mg(OH)$_2$ and Ca(OH)$_2$, or calciner output concentrations of MgO, CaO, Mg(OH)$_2$ and Ca(OH)$_2$.

In a seventh aspect, the feed material can be comprised of at least 70 weight percent carbonate material and no more than 30 weigh percent impurities. Other embodiments can utilize other types of feed compositions.

In an eighth aspect, the feed material can have average particle size of 50 micrometers to 2,000 micrometers and/or a maximum particle size that is not greater than 5,000 micrometers. In some embodiments, the feed material can also (or alternatively) have a particulate minimum size that is not larger than 5 micrometers.

In a ninth aspect, the process can also include filtering a flow output from the outlet of the calciner to separate the solid particulate material from combustion gas formed from formation of the flame. The solid particulate material can be separated from the combustion gas being calcined material.

In a tenth aspect, the process can include passing the solid particulate material through at least one dryer prior to the feeding the solid particulate material to the flame within the calciner and passing the combustion gas to the dryer to dry the solid particulate material within the dryer prior to the combustion gas being passed to a carbon capture system to capture carbon dioxide from the combustion gas.

In an eleventh aspect, the process can include filtering a flow output from the outlet of the calciner to separate the solid particulate material from combustion gas formed from formation of the flame. The solid particulate material separated from the combustion gas can be the calcined material. Also, the process can include cooling the flow output from the outlet of the calciner prior to the filtering. In some embodiments, the cooling medium for the cooling of the flow output from the outlet of the calciner prior to the filtering can comprise carbon dioxide.

In a twelfth aspect, the first aspect of the process can be combined with any and/or all of the second through eleventh aspects to form yet another aspect. For instance, the first aspect can be combined with the second aspect, third aspect, fourth aspect, fifth aspect, sixth aspect, seventh aspect, eighth aspect, ninth aspect, tenth aspect, and/or eleventh aspect to from yet other embodiments of the process.

In a thirteenth aspect, an apparatus for calcining a feed material is provided. Embodiments of the apparatus can be configured to implement an embodiment of the process for calcining a feed material. The apparatus can include a calciner and at least one burner positioned adjacent to an inlet portion of the calciner such that solid feed material fed into the calciner is passable through at least one flame formed in the calciner via the burner for calcination of the solid feed material. The calciner and the at least one burner can be arranged and positioned so that the solid feed material is passable through the at least one flame to an outlet of the calciner for calcination of the solid feed material.

In a fourteenth aspect, the apparatus can also include at least one filter device connectable to the outlet of the calciner to receive the solid feed material and combustion gas from the outlet of the calciner to filter solid particulates of the solid feed material from the combustion gas.

In a fifteenth aspect, the apparatus can be configured so that the at least one burner and the calciner are arranged and configured so that the solid feed material has a residence time for calcination of between 5 minutes and 5 seconds, between 3 minutes and 5 seconds, between 10 seconds and 30 seconds, or between 5 seconds and 1 minute.

In a sixteenth aspect, the apparatus can be configured and arranged so that the at least one burner is connectable to a source of fuel, at least one source of an oxidizer, and at least one source of the solid feed material such that at least a portion of the solid feed material is feedable to the burner for being fed into the flame.

In a seventeenth aspect, the apparatus can be configured so that the calciner is connectable to at least one source of the solid feed material so that at least a portion of the solid feed material is feedable into the calciner for being passed into the flame for partial calcination in the flame in a first phase of calcination prior to being passed out of the flame and towards the outlet of the calciner for further calcination in a second phase of calcination.

In an eighteenth aspect, the at least one burner and the calciner can be arranged and configured so that the flame facilitates calcination of the solid feed material at a pre-selected calcination temperature range of between 815° C. and 2,205° C., between 815° C. and 1,370° C., between 815° C. and 1,650° C., between 925° C. and 1,650° C. or between 925° C. and 1,370° C.

In a nineteenth aspect, the apparatus can include a carbon capture system positioned downstream of the outlet of the calciner to capture carbon dioxide from the combustion gas output from the outlet of the calciner.

In a twentieth aspect, the first aspect of the process can include utilization of any of the aspects of the apparatus discussed herein along with any other of the second aspect through twelfth aspects of the process discussed above.

In a twenty-first aspect, the apparatus of the thirteenth aspect can include any combination of the fourteenth through nineteenth aspects to form another aspect. For instance, the thirteenth aspect can be combined with all of the fourteenth aspect, fifteenth aspect, sixteenth aspect, seventeenth aspect, eighteenth aspect, and nineteenth aspect. As yet another example, the thirteenth aspect can be combined with two or more of the fourteenth aspect, fifteenth aspect, sixteenth aspect, seventeenth aspect, eighteenth aspect, and nineteenth aspect.

In a twenty-second aspect, a calcination system is provided. The calcination system can be an embodiment of the apparatus. For example, the system can include a calciner having an outlet in communication with a chamber, at least one burner connected to the calciner to form at least one flame within the chamber for calcination at a pre-selected calcination temperature range of between 815° C. and 2,205° C. and at least one filter device connected to the outlet of the calciner to receive calcined material entrained within combustion gas from the calciner to separate the calcined material from the combustion gas. The system can also include a carbon capture system connected to the at least one filter device to receive the combustion gas for removal of moisture from the combustion gas and capturing of carbon dioxide from the combustion gas. A source of solid particulate feed material can be connectable to the at least one burner and/or the calciner to feed the solid particulate feed material into the at least one flame for a first phase of calcination of the solid particulate feed material. The calciner can also be sized and configured so that the solid particulate feed material passes from the flame to the outlet within the chamber of the calciner for a second phase of calcination of the feed material so that a pre-selected residence time of the solid particulate feed material for calcination to form the calcined material is greater than 5 seconds and is less than or equal to 5 minutes.

Embodiments of the process discussed herein can be implemented via an embodiment of the system. The system can also utilize other elements (e.g. automated process control elements, sensors, conduits, compressors, heat exchangers, etc.).

Other details, objects, and advantages of processes for calcining a feed material, apparatuses for calcining a feed material (e.g. calciners, burners for calcination, calcination systems, etc.), operational aspects of the apparatuses, and methods of making and using the same will become apparent as the following description of certain exemplary embodiments thereof proceeds.

BRIEF DESCRIPTION OF THE DRAWINGS

Exemplary embodiments of processes for calcining a feed material, apparatuses for calcining a feed material (e.g. calciners, burner for calcination, calcination systems, etc.), operational aspects of the apparatuses, and methods of making and using the same are shown in the drawings included herewith. It should be understood that like reference characters used in the drawings may identify like components.

DETAILED DESCRIPTION

Figure 1:
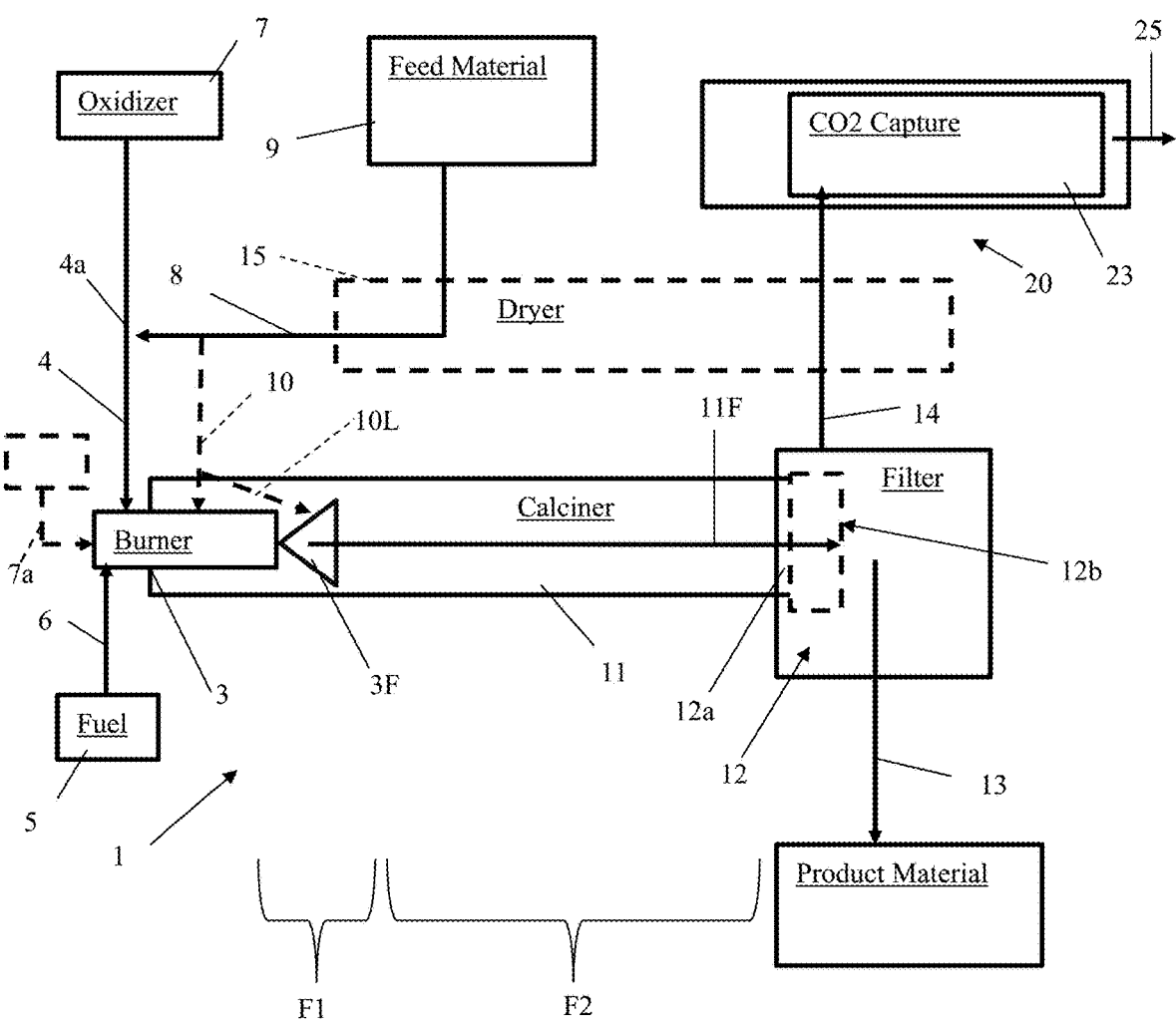
FIG. 1 is a schematic block diagram view of a first exemplary embodiment of an apparatus for calcining a feed material that can utilize an exemplary embodiment of a process for calcining a feed material.

Referring to FIGS. 1-5 an apparatus 1 for calcining a feed material can include at least one burner 3 connected to an inlet end or inlet portion of a calciner 11. The calciner 11 can be a tube, pipe, or other type of calciner structure (e.g., rectangular in cross-sectional shape, hexagonal in cross-sectional shape, cubic in shape, rectangular in shape, cylindrical in shape, etc.). In some embodiments, the inlet of the calciner 11 can be higher than the outlet of the calciner such that the calciner 11 is a declined calciner or is in a sloped orientation so that gravity can help facilitate a flow 11F of particulate material entrained within gas (e.g., flue gas from combustion of a fuel, etc.) that is passed through the body of the calciner from its inlet region to its outlet. The calciner 11 can be refractory lined in some embodiments.

There can be a single burner 3 or multiple burners 3 for formation of at least one flame 3F in the chamber of the calciner 11. Each burner 3 can receive a fuel from a fuel source 5 for formation of the flame 3F. A fuel feeding conduit 6 can connect the source of fuel to the burner 3 to feed fuel to the burner 3. The fuel 3 can be a fuel that can be combusted, such as natural gas, hydrogen, ammonia, diesel, or pulverized coal. A source of an oxidizer 7 can be connected to the burner 3 to feed at least one flow of oxidizer to the burner 3 as well. The oxidizer can be air, oxygen enriched air, oxygen, or other type of oxidizer flow. The oxidizer flow can include oxygen in a concentration of between 21 volume percent (vol %) oxygen to 100 vol % oxygen. In some embodiments, the oxygen concentration within the oxidizer can be greater than or equal to 85 vol % (e.g. at least 90 vol % oxygen, between 90 vol % oxygen and 100 vol % oxygen, between 95 vol % oxygen and 100 vol % oxygen, between 95 vol % oxygen and 99.99 vol % oxygen, between 85 vol % oxygen and 99.99 vol % oxygen, etc.).

In some embodiments, there can be a first source of an oxidizer 7 and a second source of an oxidizer 7a (shown in broken line) to feed different flows of oxidizer to the burner 3. In embodiments that can utilize multiple flows of an oxidizer as oxidizer feeds to the burner 3, there can be a first oxidizer feed conduit between the first source of an oxidizer and the burner as well as a second oxidizer feed conduit between the burner 3 and the second source of oxidizer. The oxidizer for each flow of oxidizer can be air, oxygen enriched air, oxygen, or other type of oxidizer flow. In some embodiments, the different flows of oxidizers can be different types of oxidizers (e.g., a flow of air and a flow of oxygen enriched air can be first and second flows of oxidizer fed to the burner 3, a flow of oxygen and a flow of oxygen enriched air can be first and second flows of oxidizer fed to the burner, etc.). The oxidizer flow fed to the burner 3 from each oxidant source can include oxygen in a concentration of between 21 volume percent (vol %) oxygen to 100 vol % oxygen.

In other embodiments, there may only be a single flow of oxidizer fed to the burner 3 via an oxidizer feed conduit 4 (which can also be considered a first oxidizer feed conduit) positioned between a source of the oxidizer 7 and the burner 3. In such embodiments, the oxidizer can be air, oxygen enriched air, or oxygen that is fed to the burner via at least one compressor or other source of oxidant.

Solid particulate feed material can be fed to the calciner 11 and/or the burner 3 via a feed material feed conduit 8 that can be positioned between the source of the feed material 9 and the burner 3 and/or calciner 11. In some embodiments, the feed material feed conduit 8 can feed solid particulate material to a flow of oxidizer for mixing at a mixing location 4a upstream of the burner 3. There can be an in-line mixer or other type of mixer device positioned at the mixing location 4a to facilitate entrainment of solid particulates of the feed material with a flow of oxidizer passing through the oxidizer feed conduit 4, for example. A mixture of solid particulates of the feed material entrained within the oxidizer can be passed from the mixing location 4a to the burner 3 for being emitted out of the burner 3 into a flame 3F formed by the burner 3.

In addition, or as an alternative, feed material can be fed from the source of feed material 9 to the burner 3 via a separate feed material feed conduit 10. In such embodiments, the feed material can be entrained in a carrier gas (e.g., an oxidant or other suitable carrier gas such as carbon dioxide gas or a flue gas) prior to being fed to the burner 3 or can be fed to the calciner 11 or burner 3 without being entrained in a fluid or gas. In some embodiments, the particulate feed material can also, or alternatively, be fed into the calciner 11 adjacent the burner 3 and the flame 3F generated by the burner 3 so that the particulate material is fed into the flame 3F for being calcined therein for a first phase F1 of calcination prior to being passed out of the flame 3F and toward the outlet of the calciner 11 along a flow path of the flow 11F of particulate material for further calcination within the calciner 3 during a second phase F2 of calcination before being output from the outlet of the calciner 11. For instance, at least some particulate feed material can be fed to a lance adjacent a burner via a lance feed conduit 10L for being fed into the calciner 11 adjacent the burner 3 and flame 3F.

It should be appreciated that the particulate feed material can be fed entirely through the burner 3, partially through the burner 3 and also partially adjacent the burner 3, or be entirely fed into the calciner 11 adjacent the burner 3 and flame 3F (e.g., via the lance feed conduit 10L, etc.). In such embodiments, the particulate feed material can be entrained within a carrier gas, which can be or include air, oxygen enriched air, carbon dioxide, a flue gas, etc. to facilitate the feeding of the solid particulate feed material into the burner 3 and/or calciner 11.

The feed material fed into the calciner 11 (directly and/or via burner 3) can be within the calciner for a pre-selected residence time. This residence time can include time the material is calcined via being exposed to and calcined within the flame 3F during a first phase F1 of calcination as well as undergoing further calcination in a second phase F2 of calcination that can occur as the material passes out of the flame 3F and to the outlet of the calciner 11 while at a pre-selected calcination temperature of the calciner or within a pre-selected calcination temperature range of the calciner 11. The residence time in which the particulate material is within the calciner 11 can be a pre-selected residence time that is less than 30 seconds, between 20 second and 30 seconds, less than 1 minute, less than 2 minutes, less than 3 minutes, or between 10 seconds and 3 minutes in some embodiments. Other embodiments can be configured to utilize another suitable residence time (e.g. less than 5 minutes and greater than 3 seconds, between 10 seconds and 5 minutes, less than 7 minutes and greater than 1 second, etc.). The pre-selected residence time can be selected to provide a pre-selected conversation rate of calcination of the feed material. For example, the pre-selected conversion rate can be between 95% and 100% conversion of the carbonate material, between 90% and 100% conversion of the carbonate material, or a conversation rate that is at least 95% of the carbonate material. Other suitable conversion rates can also be selected for the pre-selected conversion rate on which the pre-selected residence time can be based.

The pre-selected calcination temperature range for the calciner 11 can be over 815° C. and at or below 2,205° C., over 1,090° C., or in a range of 1,370° C. to 1,650° C. or a temperature of up to 2,205° C. In some embodiments the pre-selected temperature range can include a flame temperature of the flame 3F being in the 1,370° C. to 1,650° C. range, 925° C. to 1,650° C. range or 925° C. to 2,205° C. range and the temperature within the calciner 11 downstream of the flame being less than 1,650° C. and greater than 815° C. or less than 2,205° C. and greater than 815° C. In some embodiments, the pre-selected temperature range of the calciner 11 can include a first temperature range for the first phase F1 that can be in the 1,370° C. to 1,650° C. range, 1,090° C. to 1,650° C. range, 925° C. to 1,650° C. range or 925° C. to 2,205° C. range and a second temperature range for the second phase F2 that is less than 1,650° C. and greater than 815° C., less than 925° C. and greater than 815° C., or less than 2,205° C. range and greater than 815° C.

At least one filter device 12 can be positioned downstream of the calciner 11 to receive the flow of particulate material entrained in the combustion gas (e.g. flue gas) output from the calciner 11. The filter device 12 can include an inlet 12a region. The pre-selected residence time noted above can include time the particulate material is retained in this inlet region prior to undergoing filtration via at least one filter device 12 (referred to as "Filter" in FIG. 1). This portion of the residence time can be a portion of the second phase F2 of calcination discussed above, for example.

The at least one filter device 12 can include one or more cyclones, one or more bag houses, one or more high temperature particle separators, one or more dust filters, combinations thereof, or other arrangement of filtration mechanisms for separating the calcined particulate material output from the outlet of the calciner 11 from the hot exhaust gas of the flow 11F of particulate material entrained in the exhaust gas formed via combustion of the fuel via the burner 3. A filtering feed conduit 12a can be connected between the outlet of the calciner 11 and the filter device 12 for feeding the calcined solid particulate feed material entrained in the combustion gas output from the outlet of the calciner 11 to the at least one filter device 12.

In some configurations, a calcined particulate cooling device 12b can also be positioned between the outlet of the calciner 11 and the at least one filter device 12 to cool the flow output from the outlet of the calciner to a pre-selected filtering temperature range prior to the filtering of the calcined solid particulate material from the combustion gas output from the calciner's outlet. Such cooling systems can utilize a recycled flow of carbon dioxide output from the carbon capture system 20 to provide the cooling medium for the cooling system. Alternatively, air or other fluid can be used as the cooling medium for the cooling device 12b.

The solid calcined particulate material separated from the flow of exhaust gas can be output from the at least one filter device 12 via a product output conduit 13 to provide product material, which can include the calcined particulate material output from the calciner 11. The at least one filter device 12 can also output at least one flow of filtered gas 14 that can be fed to a carbon capture system 20 that can be configured to capture carbon dioxide (CO2). The carbon capture system 20 can be configured to capture CO2 as a product stream to provide CO2 product (e.g., compressed liquid CO2, compressed gas CO2, other CO2 product, etc.).

For example, the at least one flow of filtered gas 14 can be fed to a carbon capture system 20 for removing moisture or other undesired constituent from the combustion gas separated from the calcined material output from the outlet of the calciner 11 for forming high purity carbon dioxide or otherwise capturing the carbon dioxide. For example, the carbon capture system 20 can be configured to condense water and other non-CO2 constituents out of the combustion gas stream (e.g., carbon monoxide (CO) in addition to water, etc.), or can include scrubbing, compressing, and drying elements for removal of impurities for capturing the CO2. The purified exhaust gas (e.g. combustion gas) output from the calciner 11 can be fed to a CO2 capture device 23 of the CO2 capture system 20 for sequestration of the CO2 for storage and/or distribution. In some embodiments, a vent flow 25 can be output from the CO2 capture device 23 for being emitted to the atmosphere or for feeding to another plant process for other use (e.g. use as a heating medium for a heat exchanger, etc.).

In some configurations, embodiments may not utilize any filter device 12. For instance, embodiments can be incorporated into a cement manufacturing plant so that the feed material 9 comprising solid particulate material is fed directly into a rotary kiln of a cement manufacturing plant for being passed through a flame 3F for formation of lime. In such embodiments, the filter device 12 may not be needed or used as the formed calcined material can be directly used in the kiln without filtering. Combustion gas from the burner 3 can be output from the rotary kiln for treatment prior to emission of any process gas from the cement manufacturing facility. In such embodiments, the rotary kiln of the cement manufacturing plant having the burner 3 for formation of the flame 3F therein can be considered the calciner 11. Alternatively, such embodiments can be configured so that the calciner 11 can output the calcined material for feeding to the rotary kiln of the cement manufacturing plant such that no filtration device 12 for filtering the calcined solid particulate material from the combustion gas is needed or used.

As another example of an embodiment that may not use or would not use a filter device 12 for filtering of calcined solid particulate material output from a calciner 11, an embodiment can be provided in an electric arc furnace used for slag formation for making steel. In such embodiments, solid particulate feed material can be fed into a flame 3F formed in a calciner 11 to produce calcined material that can be fed to slag for use in the formation of slag via the arc furnace. Filtration of solid particulate material may not be needed in such an embodiment as the calcined material can be fed to the slag for use in the slag without filtration being needed. Exhaust gas from the operation can be output for carbon capture or other type of treatment prior to emission of any non-used or non-captured exhaust gas constituent.

The formed slag in such embodiments can subsequently be utilized to form a steel body (e.g. an ingot comprising steel formed from the slag, etc.).

In some configurations, the feed material from the source of feed material 9 can be wet (e.g. be considered mud or include moisture). For instance, the feed material can include limestone mud/dust that includes a water concentration in the range of 20 weight percent (wt %) water to 40 wt % water, 10 wt % water to 40 wt % water or other water concentration. The feed material in such embodiments can undergo a pre-drying process prior to being fed to the burner 3 and/or calciner 11 by being passed through at least one dryer 15 (shown in broken line). The dryer 15 can be positioned between the at least one filter device 12 and the $CO_2$ capture system 20 to utilize the hot exhaust flow of gas 14 output from the calciner 11 to provide a hot gas that can facilitate the drying of the feed material via a heat exchanger arrangement with the feed material within the dryer 15. This hot exhaust flow of gas 14 can be output from the calciner 11 and subsequently filtered by at least one filter device 12 prior to being fed from the filter device 12 to the dryer 15 in such embodiments. After passing through the dryer 15, the exhaust gas flow can be output from the dryer 15 for being fed to the $CO_2$ capture system 20 (e.g. being fed to a condenser 21, etc.).

As noted above, the at least one filter device 12 (when utilized) can include one or more cyclones, one or more bag house filters, one or more solid particulate separators, and/or combinations thereof to facilitate filtration of solid particulates from the flow 11F of particulate material entrained in flue gas, or combustion gas, output from the outlet of the calciner 11. Also, for these types of arrangements of the apparatus 1 that can utilize a dryer 15, a filtration feed conduit 12a can be positioned between the filter device 12 and the outlet of the calciner 11. The filtration feed conduit 12a can include a hopper or inlet of a particulate feed vessel of a filtration device (e.g. hopper of a cyclone, inlet of a cyclone or baghouse, etc.) that is connected to the outlet of the calciner 11, for example.

As also noted above, it should be appreciated that embodiments of the burner 3 can utilize different types of fuel or oxidizers. For example, as an alternative (or in addition) to use of natural gas, embodiments can utilize an atomized liquid fuel or a pulverized solid fuel (e.g. pulverized coal) in a carrier gas or other fuel source. It should also be appreciated that a fuel can include a combustible material. Examples of a fuel can include natural gas, propane, hydrogen, diesel, coal, or other fuel sources that can be combusted. Fuel can be passed through at least one nozzle of a burner 3.

Oxidant can refer to a fluid that includes a concentration of oxygen therein that can be utilized for combustion of fuel. For example, the oxygen content of the oxidizer utilized in the burner 3 can be in the range of 21 vol % oxygen to 100 vol % oxygen, 30 vol % oxygen to 70 vol % oxygen, 35 vol % oxygen to 60 vol % oxygen, or other suitable range of oxygen content. In some configurations, the oxidizer flow fed to the burner 3 can be 90 vol % oxygen to 100 vol % oxygen, for example. The oxidizer can be any suitable oxidizer. For instance, the oxidizer can include air, oxygen enriched air, and/or oxygen gas flows, for example. The oxidant can be passed through a nozzle of a burner element (e.g. an annular nozzle that surrounds an inner nozzle of the burner element or is a central, innermost nozzle of a burner element).

In some embodiments, a fuel or other material can be included with an oxidant passed through an annular nozzle or other type of nozzle of the burner 3. In other embodiments, fuel can be passed through one or more nozzles while the feed material and/or oxidant are passed through one or more other nozzles of the burner 3.

Example burners 3 that can be used in the apparatus 1 for calcining solid feed material can be appreciated from the above as well as the exemplary embodiments of the burner 3 shown in FIGS. 2-5. For example, the burner 3 can be structured to include multiple concentric nozzles that include a first inner nozzle 3d, a second annular nozzle 3e spaced apart from the first inner nozzle 3d and positioned around a periphery of the first inner nozzle 3d, and a third annular nozzle 3f that is spaced apart from the second annular nozzle 3e and is positioned around the second annular nozzle 3e such that the second annular nozzle 3e is positioned between the first inner nozzle 3d and the third annular nozzle 3f. The third annular nozzle 3f can be considered an outermost nozzle in some embodiments. The first inner nozzle 3d can be positioned centrally and inward relative to the second and third annular nozzles 3e and 3f. The cross-sectional shape of the first inner nozzle can be any suitable shape (e.g. circular, oval, polygonal, etc.). The annular cross-sections of the second and third annular nozzles 3e and 3f can also be any suitable cross-sectional shape (e.g. ring-like in shape, etc.).

The nozzles of the burner 3 can be positioned on a burner outlet plane of the burner 3 that faces in inner cavity, chamber, or channel of the calciner 11 for combusting the fuel and emitting a flame 3F in the calciner 11. The flame 3F can be adjacent an inlet region of the calciner 11, for example. The inlet region can be on a first side of the calciner 11 that is opposite the outlet side of the calciner 11 through which calcined material and exhaust gas can be output (e.g. output toward or to a filter device 12 as discussed above).

Figure 2:
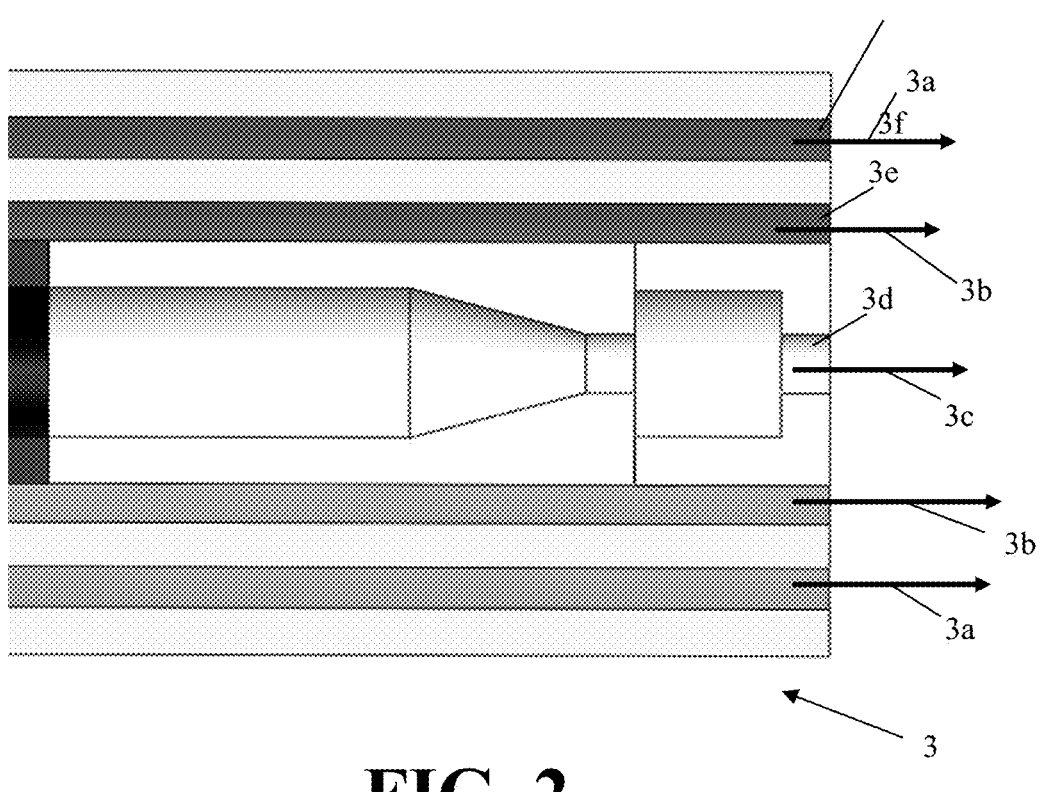
FIG. 2 is a schematic cross sectional view of the first exemplary embodiment of the burner 3.
Figure 3:
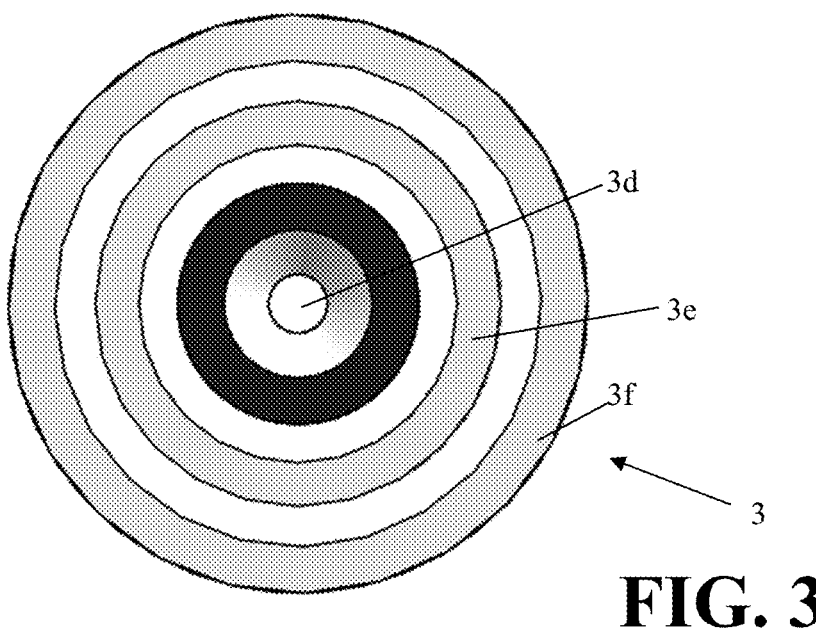
FIG. 3 is a schematic end view of the first exemplary embodiment of the burner 3 shown in FIG. 2.

In some embodiments, such as the embodiment shown in FIGS. 2-3, the burner 3 can be configured to emit a first oxidant flow 3c that includes a first oxidant at a first oxidant velocity. The first oxidant can be oxygen, oxygen enriched air, or air. The first oxidant can be, for example. 95 vol % oxygen, or 80 vol % oxygen to 100 vol % oxygen, for example. The first oxidant exit velocity can be sonic velocity or can be another suitable velocity (e.g. 10 m/s to 100 m/s etc.). The velocity of the first oxidant flow 3c can also be considered a velocity of the first oxidant flow 3c output from the burner 3.

The first annular nozzle 3e can emit a first fuel flow 3b at a first fuel velocity. The first fuel of the first fuel flow 3b can include natural gas and the first fuel velocity can be any suitable velocity (e.g. a velocity of 10-100 m/s or 5 m/s to 110 m/s, etc.). The first fuel of the first fuel flow 3b can alternatively include diesel, pulverized coal entrained in air, hydrogen, or other suitable fuel. The velocity of the first fuel flow 3b can also be considered a velocity of the first fuel flow 3b output from the burner 3.

The second annular nozzle 3f can emit a first particulate flow 3a. The first particulate flow 3a can include solid particulate material from the source of feed material 9 that is entrained in a carrier gas. The carrier gas of the first particulate flow 3a can be an oxidant or include an oxidant. For example, the oxidant of the first particulate flow 3a can include the same type of oxidant as the first oxidant or a different oxidant. For instance, first particulate flow 3a can include a second oxidant and the second oxidant can be air or oxygen enriched air while the first oxidant of the first oxidant flow 3c is oxygen. As another example, the oxidant of the first particulate flow 3a can be oxygen and the oxidant of the first oxidant flow can also be oxygen or include oxygen.

Alternatively, the carrier gas that entrains the particulate feed material of the first particulate flow 3a may not include an oxidant. For example, the carrier gas can include carbon dioxide or be a flue gas output from a combustor or other element of a plant connected to the apparatus 1 for calcining feed material that may not have any oxygen or a small concentration of oxygen (e.g. less than 3 vol % oxygen).

The velocity of the first particulate flow 3a (e.g. particulates entrained in the second oxidant or other carrier gas) can be any suitable velocity (e.g. a velocity of 1-65 m/s, etc.). The velocity of the first particulate flow 3a can also be considered a velocity of the first particulate flow 3a output from the burner 3.

Other embodiment of the burner 3 can be configured so that different nozzles emit different flows. For instance, as shown in the embodiment of FIGS. 4-5, the burner's first inner nozzle 3d can emit the first particulate flow 3a, the second annular nozzle 3e can emit the first fuel flow 3b, and the third annular nozzle 3f can emit the first oxidant flow 3c.

The exemplary burner 3 of FIGS. 2-3 can also be configured so these nozzles emit these flows as an alternative operational configuration so that the burner 3 of FIGS. 2-3 is operated such that first inner nozzle 3d can emit the first particulate flow 3a, the second annular nozzle 3e can emit the first fuel flow 3b, and the third annular nozzle 3f can emit the first oxidant flow 3c.

Figure 4:
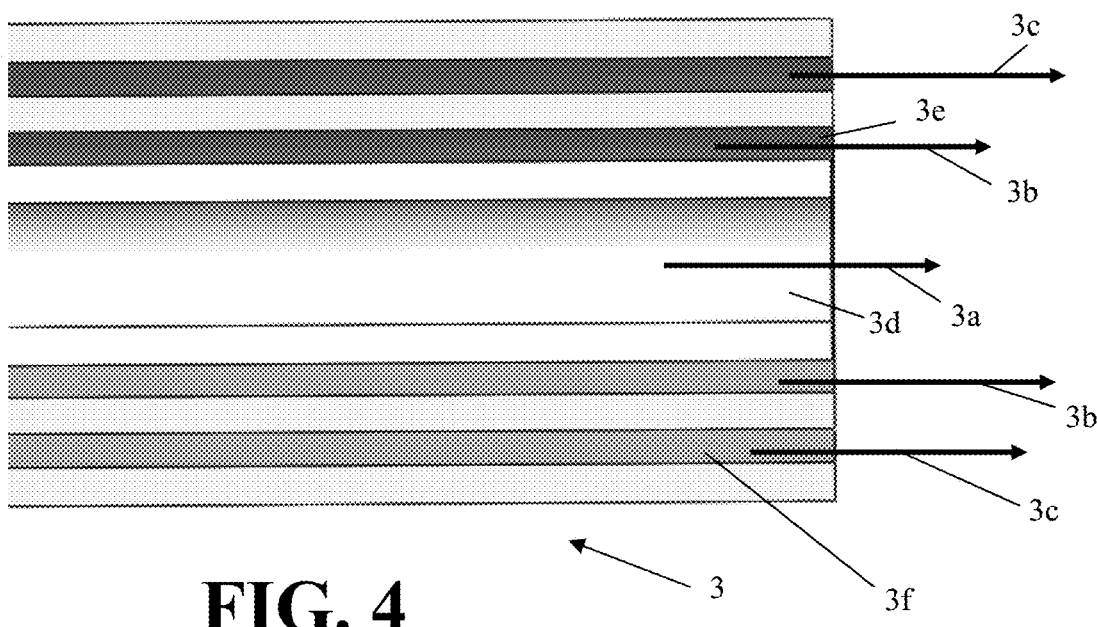
FIG. 4 is another schematic cross-sectional view of another exemplary embodiment of the burner 3.
Figure 5:
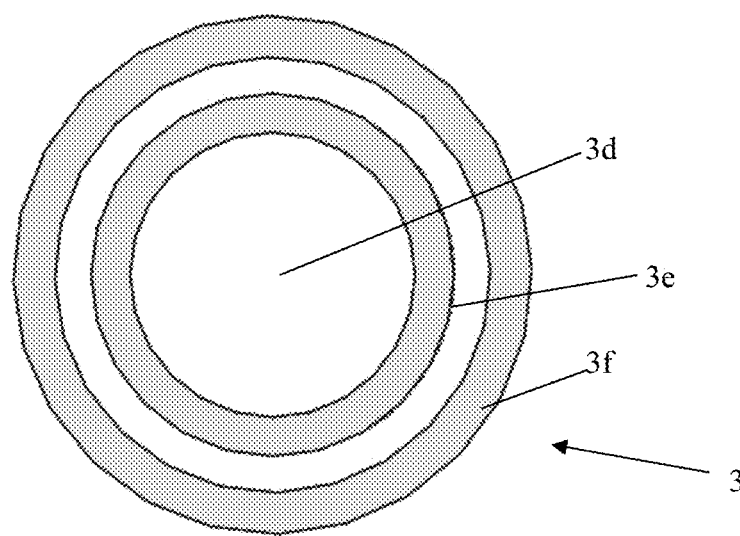
FIG. 5 is a schematic end view of the exemplary embodiment of the burner 3 shown in FIG. 4

Also, the exemplary burner 3 of FIGS. 4-5 can be alternatively configured so that the burner's first inner nozzle 3d can emit the first oxidant flow 3c, the second annular nozzle 3e can emit the first fuel flow 3b, and the third annular nozzle 3f can emit the first particulate flow 3a.

In yet other embodiments, the burners 3 of FIGS. 2-3 and 4-5 can be configured so that the first particulate flow 3a does not include any particulates and is only comprised of a second oxidant. In such embodiments, the particulates from the source of feed material may only be fed into the calciner 11 adjacent the flame 3F for being pass through the flame 3F (e.g. via a lance feed conduit 10L). In such embodiments, the first particulate flow 3a can be considered a second oxidant flow since there are no particulates entrained within that flow.

In yet other embodiments (e.g. burner configurations in which particulate material is not fed through the burner for being injected into the flame 3F), the burner 3 may not include three or more nozzles. Instead, the burner 3 can include a single nozzle having fuel entrained with an oxidant or first and second nozzles that emit a first oxidant flow and a first fuel flow. As yet another alternative embodiment, the burner 3 can include multiple nozzles that include a first nozzle through which fuel is output and a second nozzle through which a particulate material entrained in an oxidizer is output for combustion of the fuel to form the flame 3F in the calciner 11. It should therefore be appreciated that numerous other burner designs can be utilized for formation of the flame 3F therein so that the calciner 11 operates within the pre-selected calcination temperature range for the first and second phases F1 and F2 of calcination.

The burner 3 can be configured to emit the flame 3F and operate with a pre-selected equivalence ratio. The equivalence ratio can be the ratio of the actual fuel/oxidant ratio to the stoichiometric fuel/oxidant ratio The pre-selected equivalence ratio can be in the range of 0.8 to 1.2 etc. In some embodiments, the pre-selected equivalence ratio can be greater than or equal to 0.9 to 1.05, between 0.9 and 1.1, between 0.9 and 1.05, between 0.95 and 1.0, 0.9, 0.0.95, 1.0, or between 0.9 and 1.1, for example.

Embodiments of the apparatus 1 for calcining a feed material can include a plurality of sensors and other process control elements (e.g. control valves, etc.) communicatively connected to controller. The controller can include a workstation that runs an automated process control program that is also communicatively connected to the control valves, sensors, and other control elements or can be a controller that is included in a distributed control system (DCS). The controller can include a computer device that has a processor connected to a non-transitory computer readable medium having the code of the control program stored thereon and at least one transceiver for communicative connections to the control valves and sensors (e.g. via a network connection, wireless network connection, or wired communicative connection, etc.). One or more input devices can be connectable to the controller to permit a user to provide input to the controller. One or more output devices (e.g. a display, a printer, etc.) can be communicatively connected to the controller for providing output to the user as well.

Embodiments of the apparatus 1 for calcining feed material can be configured so that the solid particulate feed material fed to the burner 3 and/or the calciner 11 from the source of feed material 9 includes carbonate material. The carbonate material can be CaCO3, MgCO3, a combination of CaCO3 and MgCO3, or other suitable carbonate material, for example. The material composition of the feed material can include a pre-selected carbonate composition as well as an impurity concentration.

The pre-selected carbonate composition can include magnesium carbonate and/or calcium carbonate, for example. For instance, the pre-selected carbonate concentration can be at least 70 wt % CaCO3, between 70 wt % and 99 wt % CaCO3, or other suitable CaCO3 concentration or can be 70 wt % MgCO3, between 70 wt % and 99 wt % MgCO3, or other suitable MgCO3. The pre-selected carbonate concentration can also include a combination of MgCO3 and CaCO3 that comprises at least 70 wt % or between 70 wt % and 99 wt % of the feed material.

The impurity concentration can be up to 30 wt % impurities, between 30 wt % and 1 wt % impurities, or other suitable impurity concentration. The impurities of the impurity concentration for the feed material can include one or more of Fe2O3, SiO2, Al2O3, as well as other impurities.

In some embodiments, the feed material can be comminuted limestone or other suitable feed material, for example. In some embodiments, the source of feed material 9 can include particulate material stored in a hopper or other storage vessel or can be a comminution device configured to comminute a feed material prior to the feed material being fed to the calciner. This solid particulate feed material can include dust as well as large sized solid particulates. The size range of the particulate feed material can be, on average between 50 micrometers in size and 2,000 micrometers in size. Alternatively, the size range of the particulate feed material can be, on average less than 2,000 micrometers in size. For example, the particulate size range for the solid particulate feed material to be calcined can be in the 5-500 micrometer size range, 5 to 30 micrometer size range, or other suitable size range in some embodiments. In some embodiments, the feed material can have an average particle size of 2,000 micrometers and a maximum particle size that is not greater than 5,000 micrometers. Such embodiments can also include a minimum particle size that is no less than 5 micrometers (e.g. the size range can be between 5 micrometers and 5,000 micrometers).

The calciner 11 can be operated so that the solid particulate feed material fed to the flame 3F and subsequently passed through the remainder of the calciner 11 to the outlet of the calciner 11 can be calcined from CaCO3 to form CaO or Ca(OH)2. The calcined material output from the calciner to a filter device 12 can include mostly CaO or mostly Ca(OH)2, for example. In some embodiments, the calcined material output from the calciner can be over 50 weight percent (wt %) CaO, over 75 wt % CaO, over 90 wt % CaO or over 95 wt % CaO or between 90 wt % CaO and 100 wt % CaO (e.g. 95 wt % CaO to 98 wt % CaO).

Some embodiments of the calciner 11 can be operated so that Ca(OH)2 can be formed via operation of the calciner 11 and burner 3 without use of a subsequent hydration step (e.g. exposing CaO to water, etc.). For example, the calcined material output from the calciner 11 can be mostly Ca(OH)2. For example the calcined material output from the calciner 11 can be over 50 wt % Ca(OH)2, over 75 wt % Ca(OH)2 over 90 wt % Ca(OH)2 or over 95 wt % Ca(OH)2 or between 90 wt % Ca(OH)2 and 100 wt % Ca(OH)2 (e.g. 95 wt % Ca(OH)2 to 98 wt % Ca(OH)2). The formed Ca(OH)2 can be formed via operation of the calciner 11 and burner 3 without use of a subsequent hydration step (e.g. exposing CaO to water in a downstream process, etc.).

The formation of the Ca(OH)2 via calcination can be provided due to the formation of water that may occur during combustion of the fuel to form the flame 3F provided by the burner 3. We believe the chemical reaction that can occur for such calcination can be CaCO3→CaO+CO2→CaO+(H2O)→Ca(OH)2. The water (H2O) can be water from the combustion of the fuel as well as water that may be present or included with the feed material.

For feed material that uses other types of carbonate material (e.g. dolomite and/or magnesium carbonates), the calcined material can have a different composition. For instance, the calcined feed material output from the calciner 3 can be MgO or Mg(OH)$_2$ or include a combination of Ca(OH)2 and Mg(OH)2, a combination of CaO and MgO or a combination of Ca(OH)2, Mg(OH)2, CaO and MgO. In such embodiments, the calcined material output from the calciner 11 can be over 20 wt % Mg(OH)2 and over 50 wt % Ca(OH)2, between 5 wt % Mg(OH)2 and 30 wt % Mg(OH)2 and between 70 wt % Ca(OH)2, and 95 wt % Ca(OH)2, or can be another suitable composition having calciner output concentrations of Mg(OH)2 and Ca(OH)2, or calciner output concentrations of MgO, CaO, Mg(OH)2 and Ca(OH)2.

As another example, in embodiments that may only utilize a magnesium carbonate material as the type of feed material, it is contemplated that the calcined feed material output from the calciner 11 can be over 50 wt % Mg(OH)2, over 75 wt % Mg(OH)2 over 90 wt % Mg(OH)2 or over 95 wt % Mg(OH)2 or between 90 wt % Mg(OH)2 and 100 wt % Mg(OH)2 (e.g. 95 wt % Mg(OH)2 to 98 wt % Mg(OH)2), or can include calciner output concentrations of calcined material that include concentrations of MgO and Mg(OH)2.

In embodiments that form Mg(OH)2, it is contemplated that the formed Mg(OH)2 can be formed via operation of the calciner 11 and burner 3 without use of a subsequent hydration step (e.g. exposing MgO to water, etc. in a downstream process). The formation of the Mg(OH)2 via calcination can be provided due to the formation of water that may occur during combustion of the fuel to form the flame 3F provided by the burner 3. It is contemplated that the chemical reaction that can occur for such calcination can be MgCO3→MgO+CO2→MgO+(H2O)→Mg(OH)2. The water (H2O) can be water from the combustion of the fuel as well as water that may be present or included with the feed material.

Embodiments of the apparatus and process for calcining a feed material can also provide improved recovery of CO2. For instance, calcination of the feed material can be performed so that a greater amount of CO2 and/or a higher concentration of CO2 is emitted from the feed material during calcination so it can be subsequently captured as a product via the CO2 capture device 23. Embodiments can be configured to provide improved calcined material output as well as improved CO2 production for embodiments designed to provide both a CO2 product as well as a calcined material product.

Experiments and Simulations

An exemplary embodiment of an apparatus for calcining a feed material comprising CaCO$_3$ that employed an exemplary embodiment of our process for calcining feed material was utilized in confidential testing to evaluate the performance of the apparatus and process. The burner 3 was operated during the testing so that the pre-selected calcination temperature range within the calciner 11 was 1,700° F. to 1,900° F. (926° C. to 1,038° C.). The fuel used was natural gas, the oxidizer used was 90-99.99% by vol. oxygen and the particle carrier gas was 30%-45% by vol. oxygen enriched air.

Figure 6:
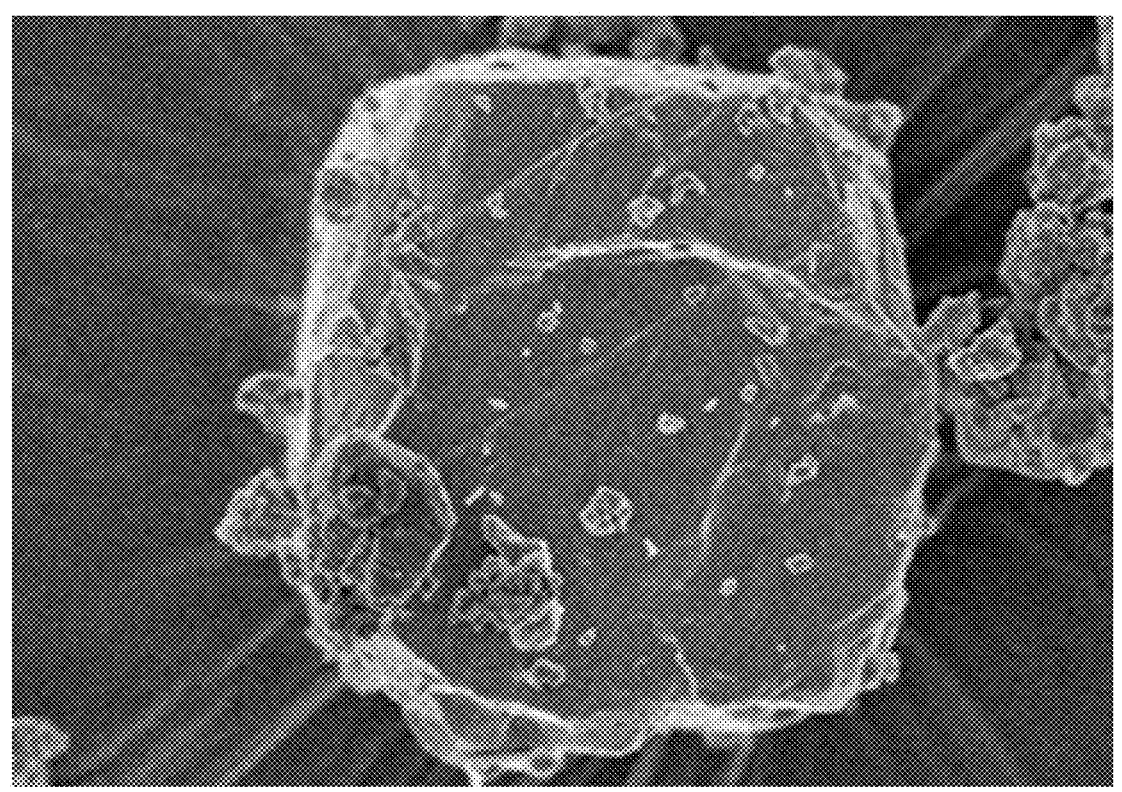
FIG. 6 is a scanning electron microcopy with energy dispersive X-ray spectroscopy (SEM/EDS) image of a first sample obtained from testing of an exemplary embodiment of an exemplary apparatus for calcining a feed material. The first sample is a raw sample prior to undergoing any calcination. The first sample can also be referred to as Sample 1.
Figure 7:
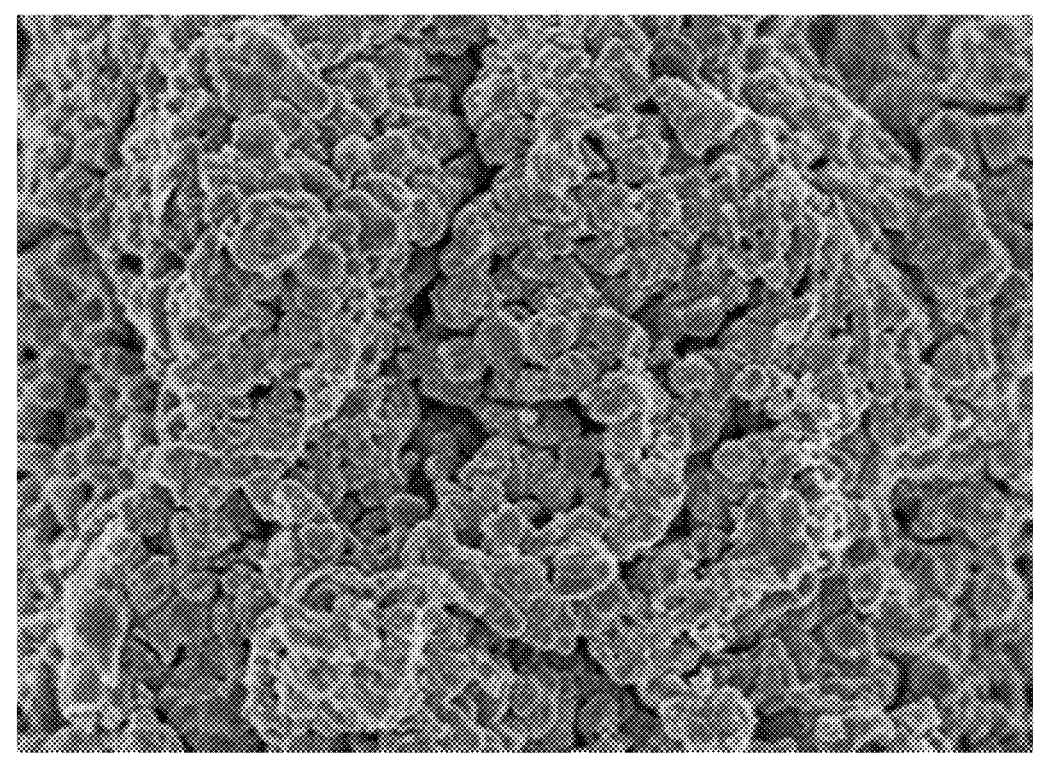
FIG. 7 is a SEM/EDS image of a second sample obtained from testing of an exemplary embodiment of an exemplary apparatus for calcining a feed material. The second sample is a partially calcined sample extracted while that sample had been exposed to a flame 3F emitted by a burner 3 of the calciner 11. The second sample can also be referred to as Sample 2.
Figure 8:
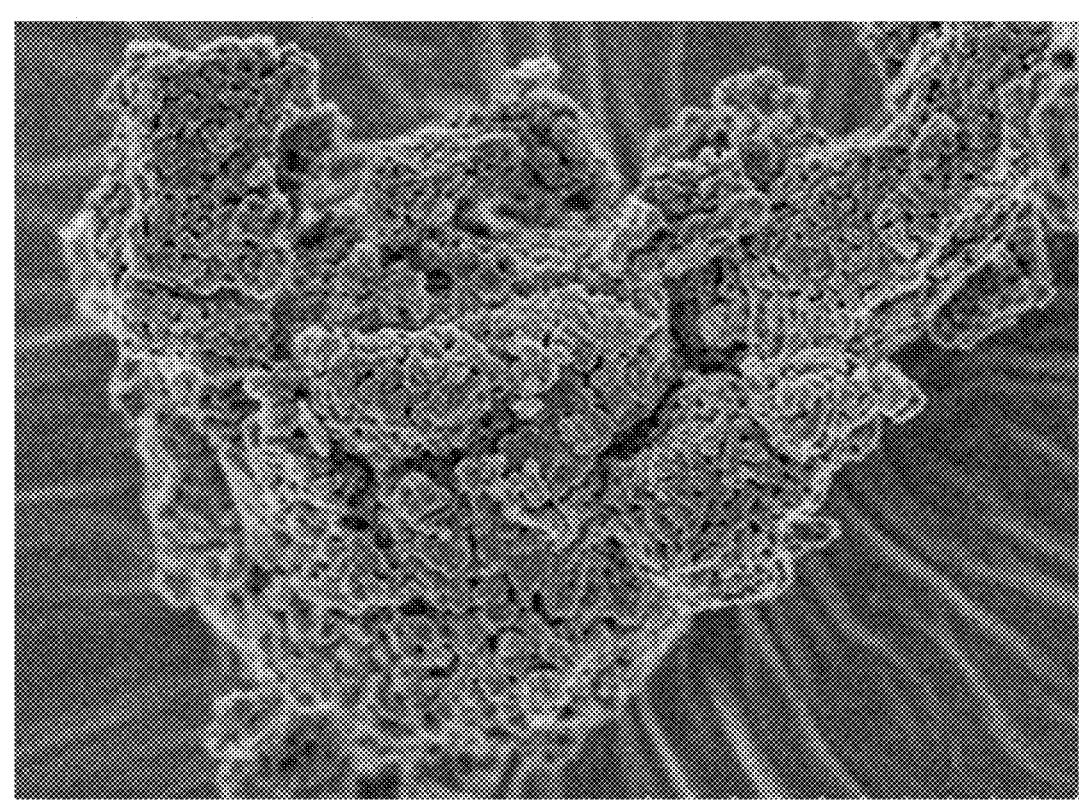
FIG. 8 is a SEM/EDS image of a third sample obtained from testing of an exemplary embodiment of an exemplary apparatus for calcining a feed material. The third sample is a calcined sample obtained after the material passed through a calciner with a residence time of 30 seconds. The third sample can also be referred to as Sample 3.

The testing results are shown in the below Table 1. Scanning electron microscope images of samples 1-3 obtained from this testing are also shown in FIGS. 6-8. Sample 1 (shown in FIG. 6) is an image of raw feed material that includes CaCO3 used in the testing. Sample 2 (shown in FIG. 7) is a partially calcined material extracted from a flame 3F of the burner 3 obtained from the first phase F1 of calcination during testing. Sample 3 (shown in FIG. 8) is a fully calcined material obtained from an outlet of the calciner 11 after the second phase F2 of calcination during the conducted testing. A 30 second residence time was used for the conducted experiments.

TABLE 1

Crystalline Phase Composition Of Samples Of FIGS. 6-8

| Phase | Sample 1 (FIG. 6) | Sample 2 (FIG. 7) | Sample 3 (FIG. 8) |
|---|---|---|---|
| $CaCO_3$ | 96.2 wt % | 21.6 wt % | 2.0 wt % |
| $Ca(OH)_2$ | 0.0 wt % | 76.3 wt % | 97.7 wt % |
| $SiO_2$ | 1.2 wt % | 0.3 wt % | 0.3 wt % |
| $CaMg(CO_3)_2$ | 2.7 wt % | 0.0 wt % | 0.0 wt % |
| $Ca_6(Si_2O_7)(SiO_4)(OH)_2$ | 0.0 wt % | 1.8 wt % | 0.0 wt % |

Figure 9:
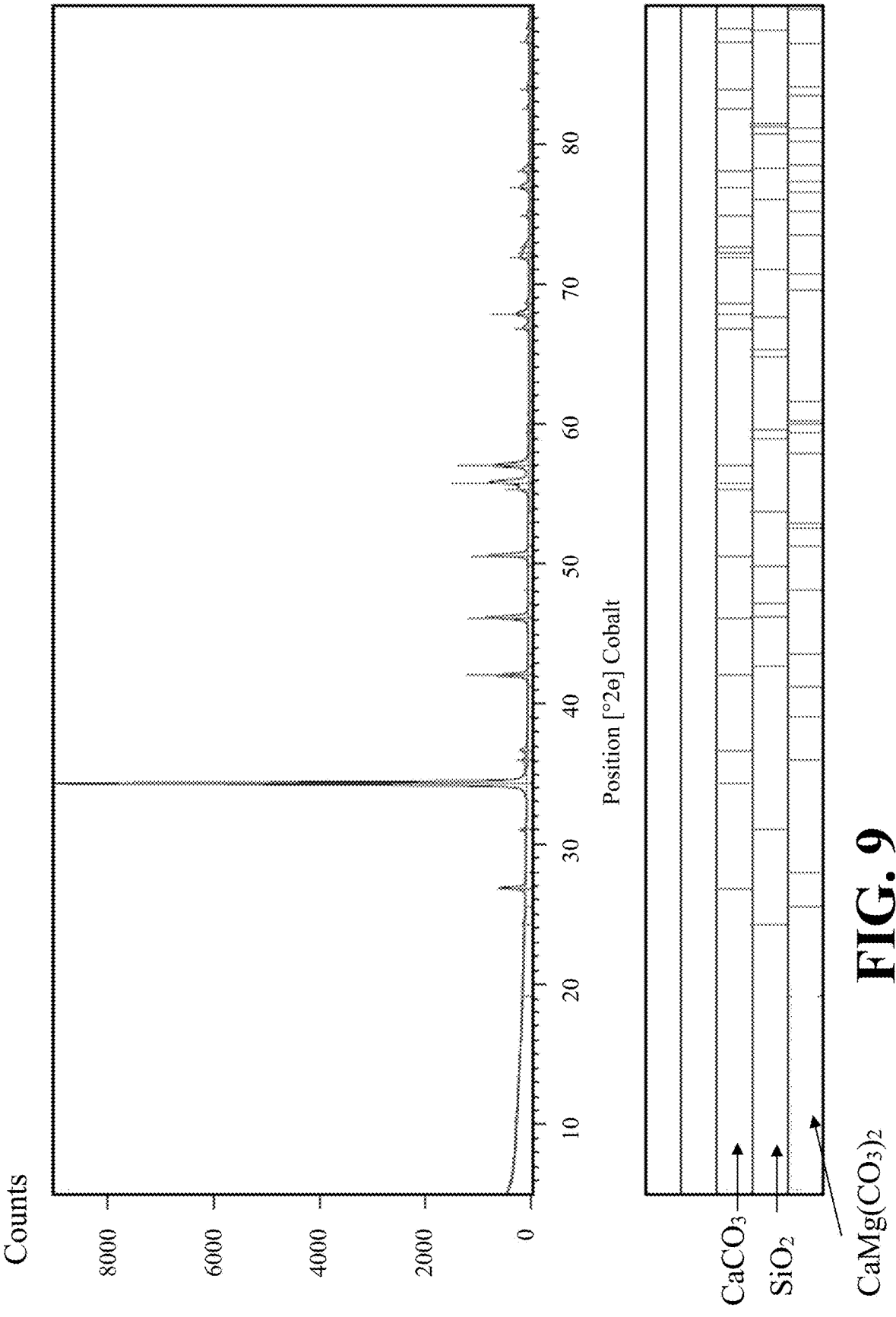
FIG. 9 is a series of graphs illustrating data obtained via X-ray Powder Diffraction (XRD) illustrating diffraction peaks in XRD data that were matched to reference patterns for Sample 1, which was a sample of raw material prior to being calcined in conducted experimentation discussed herein.
Figure 10:
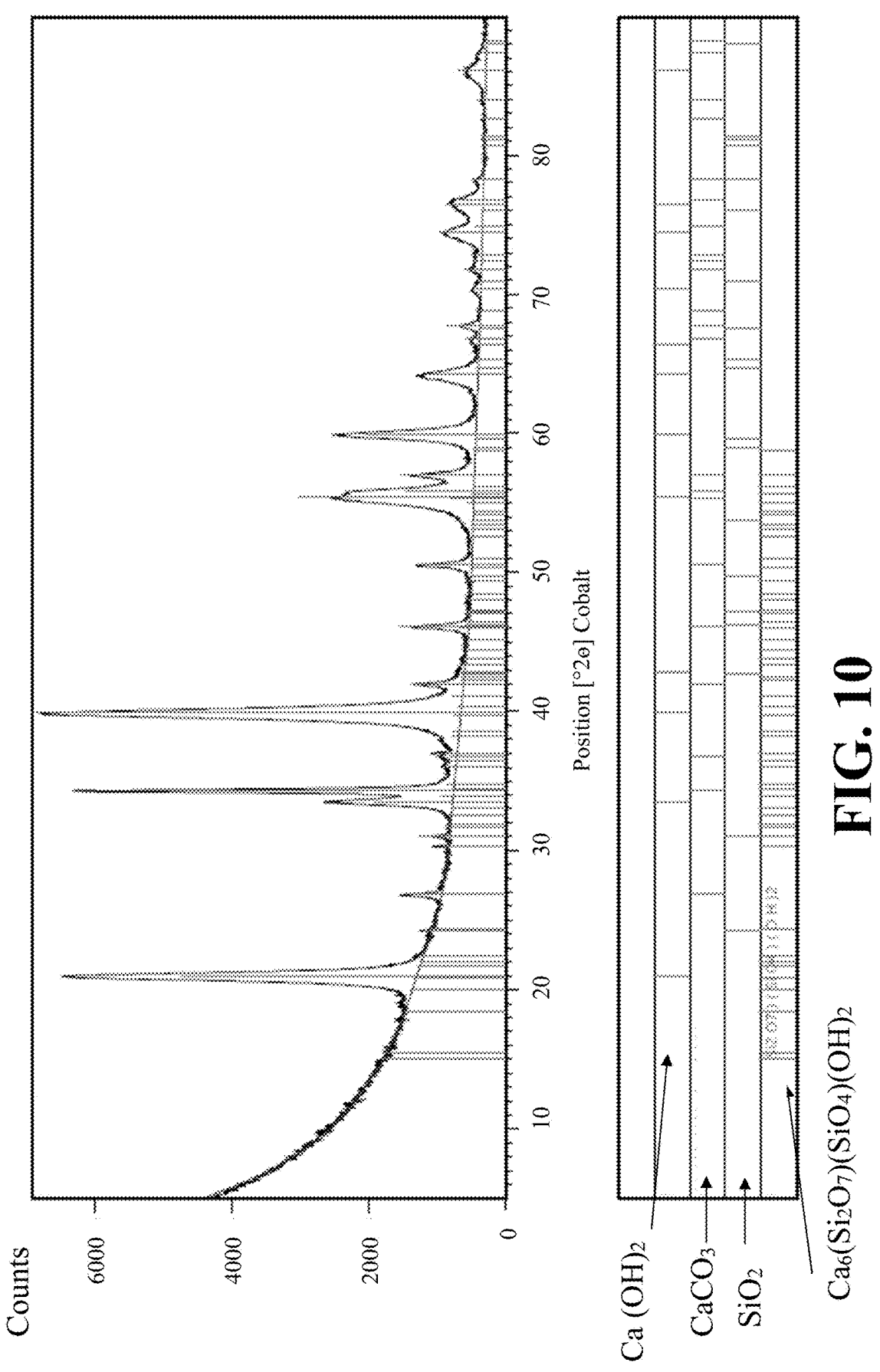
FIG. 10 is a series of graphs illustrating data obtained via XRD illustrating diffraction peaks in XRD data that were matched to reference patterns for Sample 2, which was a sample of partially calcined material collected from within a flame 3F during the first phase F1 of calcination in conducted experimentation discussed herein.
Figure 11:
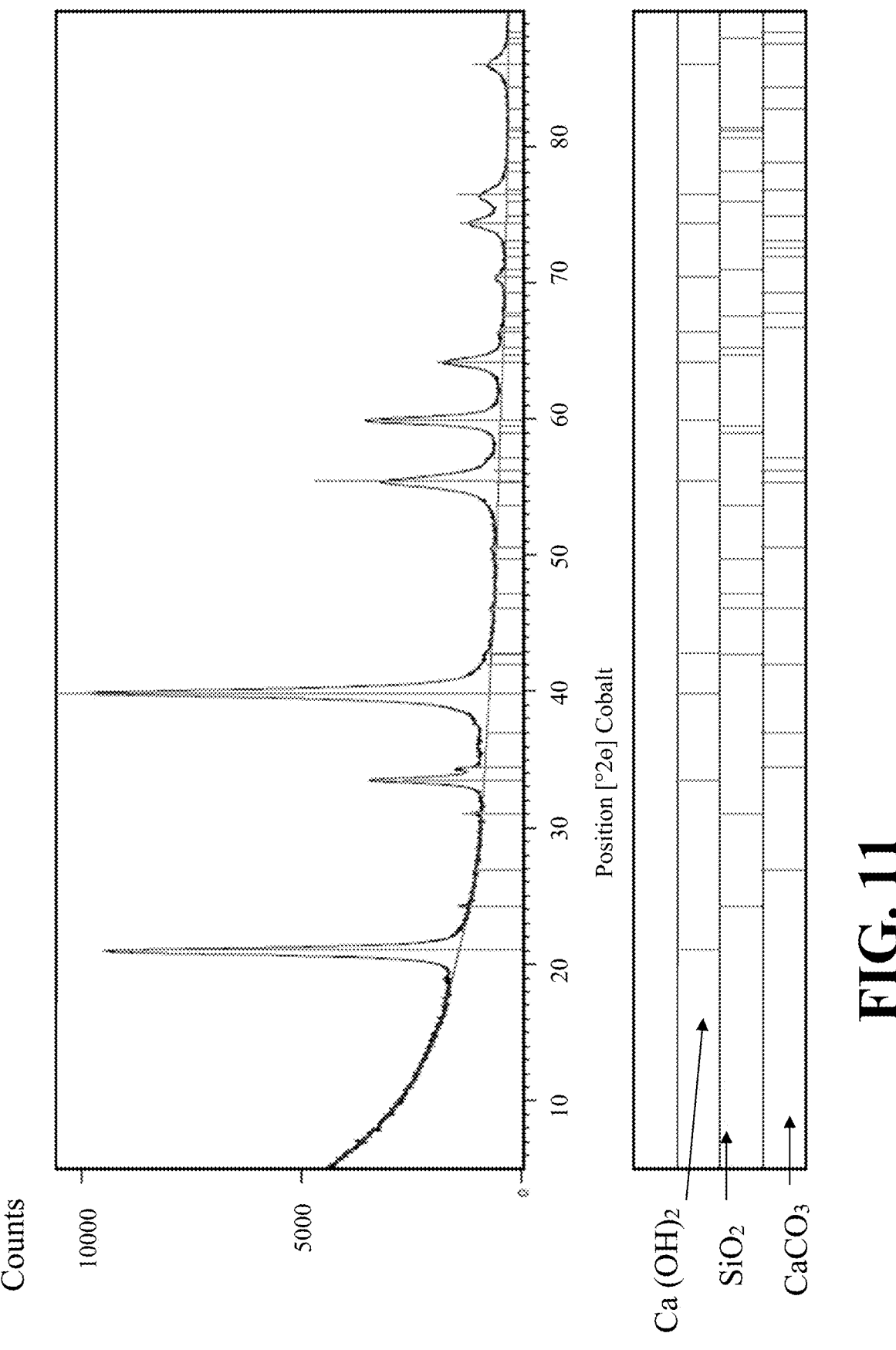
FIG. 11 is a series of graphs illustrating data obtained via XRD illustrating diffraction peaks in XRD data that were matched to reference patterns for Sample 3, which was a sample of calcined material output from an outlet of the calciner 11 after having been emitted from an outlet of the calciner after the second phase F2 of calcination in conducted experimentation discussed herein.
Figure 12:
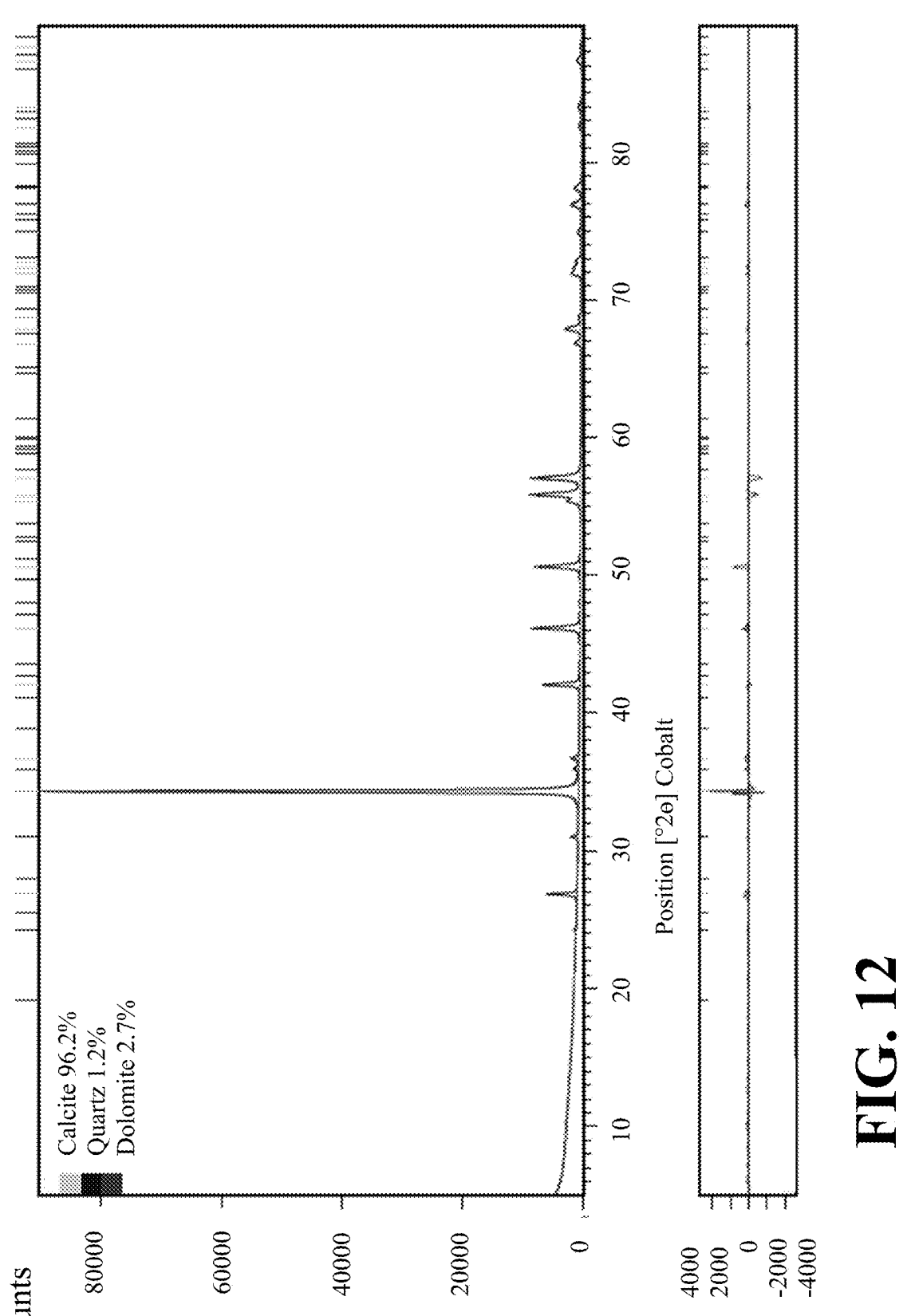
FIG. 12 is a series of graphs illustrating a fit of calculated intensities from refined sample model for Sample 1 to the observed XRD data for Sample 1 obtained during experimentation discussed herein.
Figure 13:
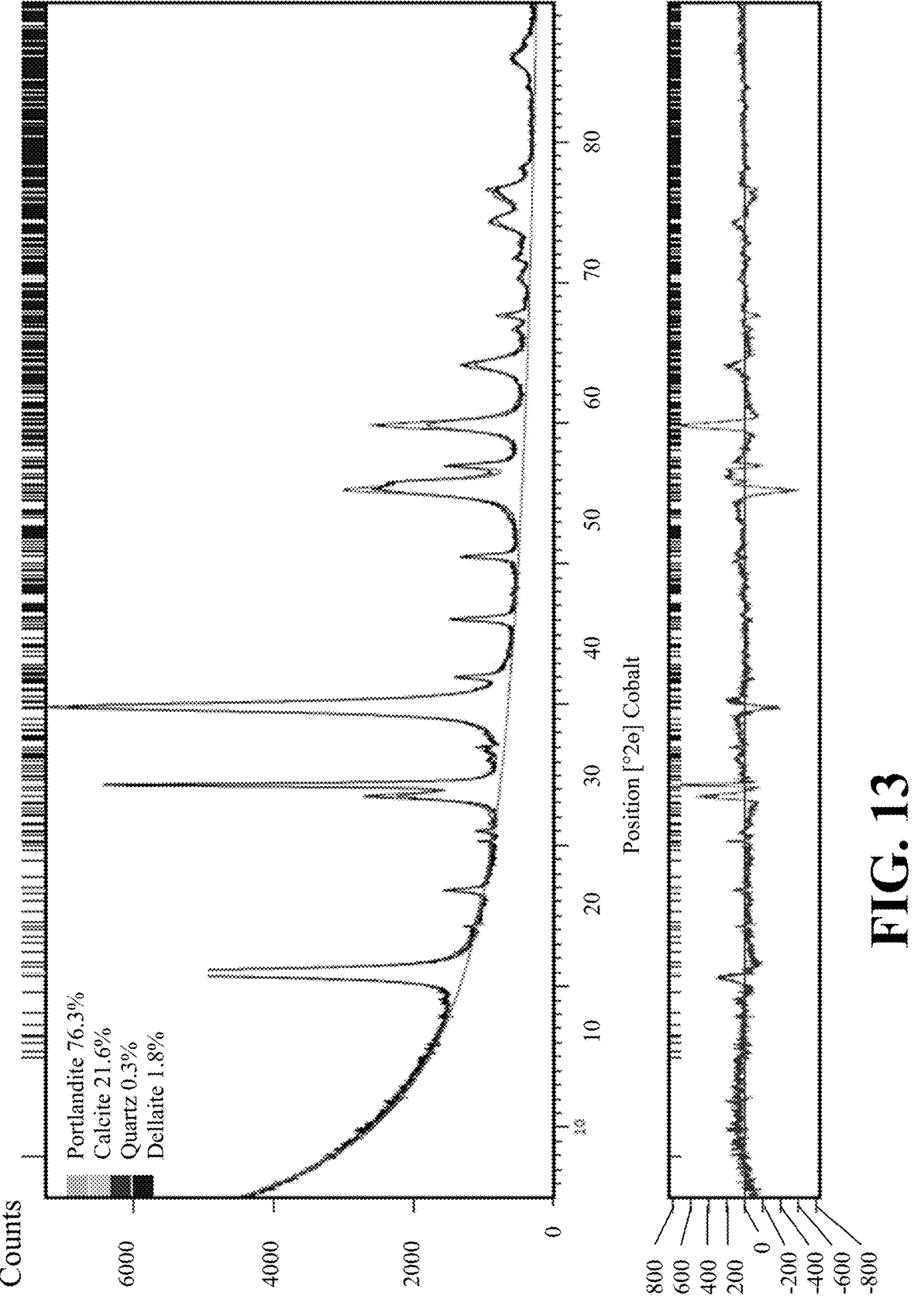
FIG. 13 is a series of graphs illustrating a fit of calculated intensities from refined sample model for Sample 2 to the observed XRD data for Sample 2 obtained during experimentation discussed herein.
Figure 14:
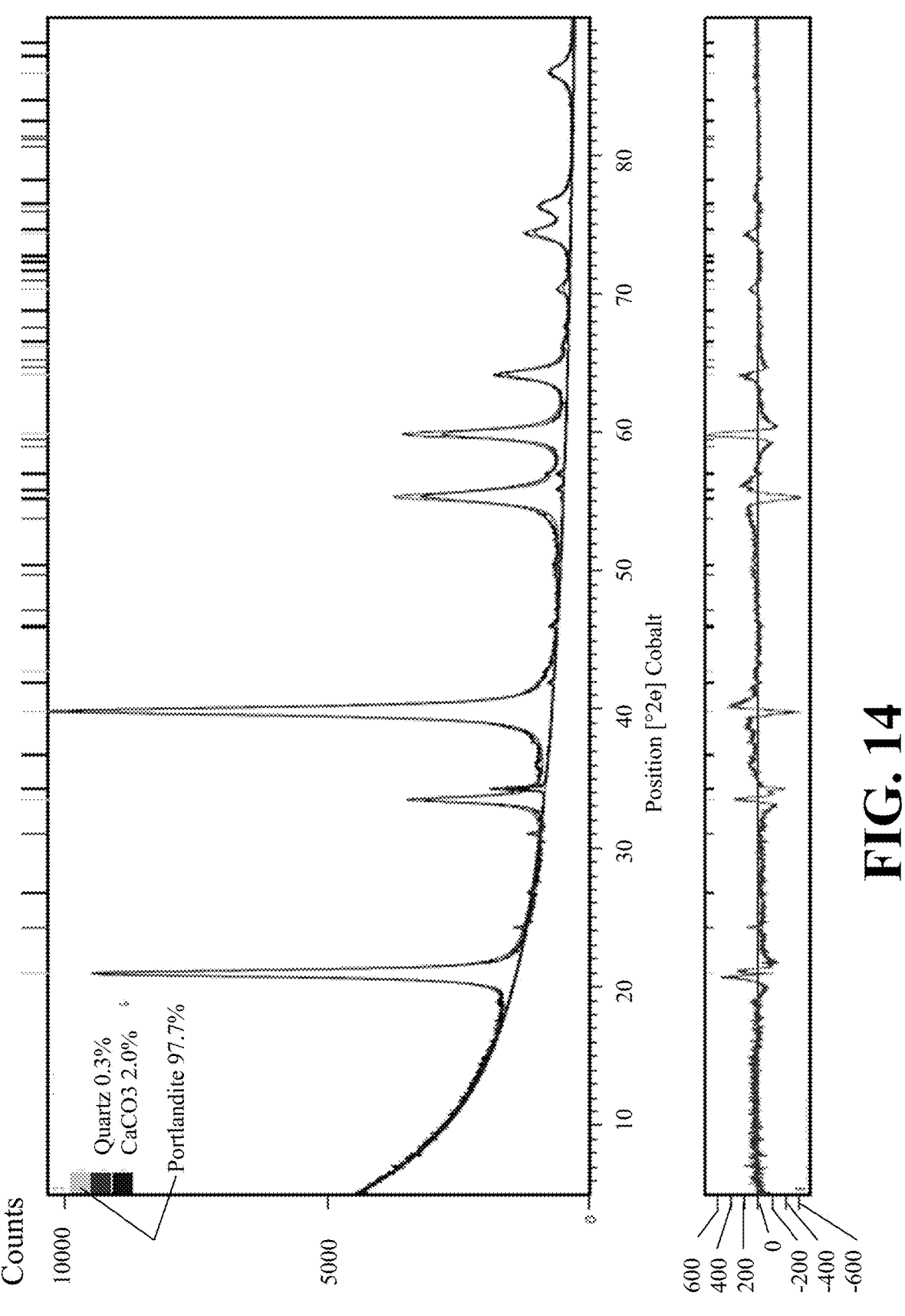
FIG. 14 is a series of graphs illustrating a fit of calculated intensities from refined sample model for Sample 3 to the observed XRD data for Sample 3 obtained during experimentation discussed herein.

The Table 1 above shows that crystalline composition of solid particulate material that was calcined via during the testing. This data was obtained via X-ray Powder Diffraction (XRD) analysis of the samples. The diffraction peaks in the XRD data were matched to reference patterns as shown in FIGS. 9-11. The crystal structures for the identified phases were used to refine the relative compositions of the crystalline portions of the samples. The amorphous contents of the samples are unknown. Fits of the calculated intensities from the refined sample models to the observed XRD data are shown in FIGS. 12-14. As noted above, Sample 1 is the raw material prior to being calcined, Sample 2 is the material that was partially calcined and collected from within the flame 3F of the burner 3 during the first phase F1 of calcination, and Sample 3 is calcined material output from an outlet of the calciner 11 after having been emitted from an outlet of the calciner after the second phase F2 of calcination.

Scanning electron microcopy with energy dispersive X-ray spectroscopy (SEM/EDS) images of the Samples 1-3 are shown in FIGS. 6-8. These images were obtained via 2 kV accelerating voltage at a 12,0000× magnification. FIGS. 6-8 are based on images obtained on a 4.00 micrometer (μm) scale.

As can be appreciated from the above results, testing showed that a feed material of over 95 wt % $CaCO3$ was able to be calcined into a calcined material that comprised over 97.5 wt % $Ca(OH)2$ without that material having to undergo an exposure to water downstream of the calciner 11. Such results show that embodiments can provide enhanced calcination of material at significantly shorter residence times.

As can be appreciated from FIG. 6, the feed material had a smooth morphology/surface texture. In contrast, samples 2 and 3 as shown in FIGS. 7-8 have nodular appearances, which indicate a significant amount of $CO2$ was extracted from the feed material via calcination. These obtained images corroborate the XRD data obtained from the testing, which shows a very efficient calcination of the feed material that can result in a significant formation of $CO2$ within the gas output from the calciner for downstream use in carbon capture. The testing showed that in addition to improvements in calcination, improved $CO2$ production and capture can be obtained by embodiments of our process and apparatus. These images, in addition to the composition analysis discussed above, show that embodiments can provide improved $CO2$ production to provide improved $CO2$ yields in addition to improved calcination performance.

We also performed simulation work for an exemplary embodiment of our apparatus and process for calcining material. In the simulated embodiment, the burner 3 was operated so that it received 6.96 MMBTU/hr of natural gas as well as 15,000 Standard Cubic Feet per Hour (SCFH) oxygen and 1.853 tons per hour of $CaCO3$ particulate material. In this simulated embodiment, all the $CaCO3$ containing feed material was passed through the burner for being fed to the calciner 11. Operation of this simulated embodiment resulted in formation of 1.0 on per hour lime (CaO) as well as 1.161 tons per hour of $CO2$.

These simulation results further showed that embodiments can provide significant improvements in operational performance using smaller sized equipment adapted for the relatively short residence times usable for calcination (e.g. less than 5 minutes, less than 7 minutes, less than 3 minutes of residence time, less than 1 minute of residence time etc.).

Embodiments of our apparatus and process can be utilized so that smaller sized equipment can be used for calcining feed material. The smaller sized equipment can be used due to the smaller residence times that can be needed. This can help greatly reduce capital and construction costs associated with building a calcination facility, for example. Further, the operational and maintenance costs can be reduced due to the smaller sized footprint such embodiments may have.

Embodiments that do not use air as an oxidant or use less air as compared to conventional systems can also provide an improved ecological impact by avoiding formation of nitrous oxides and/or reducing the formation of nitrous oxides. Such embodiments may also (or alternatively) use simpler exhaust cleaning devices to remove such undesirable elements from exhaust gas prior to that gas being emitted to the atmosphere.

As discussed above, embodiments can also be provided so that $Ca(OH)2$ and/or $Mg(OH)2$ can be formed without use of water in a separation processing step (e.g. a hydration step). Such a separate processing step can include a hydration step that may occur after lime is formed via calcination, for example. This can provide further improved ecological performance in operation by avoiding the need to use water and/or form wastewater that may need treated. It should therefore be appreciated that embodiments can provide improved ecological effects in addition to improvements in operation and reductions in cost.

It should be appreciated that embodiments of the apparatus 1 for calcining feed material and embodiments of the process for calcining feed material can be adapted to meet a particular set of design criteria. Also, (and as discussed above) apparatuses 1 for calcining solid particulate feed material (e.g. calciners, calcination systems) and burners 3 that can be incorporated into such devices can be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the system, etc.).

Further, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of processes for calcining a feed material, apparatuses for calcining a feed material, and methods of making and using the same have been shown and described above, it is to be distinctly understood that the invention is not limited thereto but may be otherwise variously embodied and practiced within the scope of the following claims.

What is claimed is:

1. A process for calcining a feed material comprising:
   feeding solid particulate material to a flame formed in a calciner so the solid particulate material passes through the flame as the solid particulate material moves through the calciner to an outlet of the calciner;
   wherein the solid particulate material has a residence time for calcination of between 5 minutes and 5 seconds, between 3 minutes and 5 seconds, between 10 seconds and 30 seconds, or between 5 seconds and 1 minute;
   wherein the feed material is comprised of at least 70 weight percent carbonate material and no more than 30 weight percent impurities.

2. The process of claim 1, wherein the feeding of the solid particulate material to the flame comprises:
   passing the solid particulate material into a burner for feeding into the calciner via the burner; and/or
   passing the solid particulate material into the calciner adjacent to the flame so that the solid particulate material passes through the flame.

3. The process of claim 1, comprising:
   feeding a fuel and at least one flow of oxidant to the burner for formation of the flame in the calciner.

4. The process of claim 3, wherein the flame facilitates calcination of the solid particulate material at a pre-selected calcination temperature range of between 815° C. and 2,205° C., between 815° C. and 1,370° C., between 815° C. and 1,650° C., between 925° C. and 1,650° C. or between 925° C. and 1,370° C.

5. The process of claim 1, wherein the calcined material comprises between 70 weight percent (wt %) $Ca(OH)_2$ and 100 wt % $Ca(OH)_2$, between 80 wt % $Ca(OH)_2$ and 100 wt % $Ca(OH)_2$, or between 90 wt % $Ca(OH)_2$ and 100 wt % $Ca(OH)_2$.

6. The process of claim 1, wherein the feed material has average particle size of 50 micrometers to 2,000 micrometers and a maximum particle size that is not greater than 5,000 micrometers.

7. The process of claim 1, comprising:
filtering a flow output from the outlet of the calciner to separate the solid particulate material from combustion gas formed from formation of the flame, the solid particulate material separated from the combustion gas being calcined material.

8. The process of claim 1, comprising:
passing the solid particulate material through at least one dryer prior to the feeding the solid particulate material to the flame within the calciner; and
passing the combustion gas to the dryer to dry the solid particulate material within the dryer prior to the combustion gas being passed to a carbon capture system to capture carbon dioxide from the combustion gas.

9. The process of claim 1, comprising:
filtering a flow output from the outlet of the calciner to separate the solid particulate material from combustion gas formed from formation of the flame, the solid particulate material separated from the combustion gas being calcined material; and
cooling the flow output from the outlet of the calciner prior to the filtering.

10. The process of claim 9, wherein a cooling medium for the cooling of the flow output from the outlet of the calciner prior to the filtering comprises carbon dioxide.

11. An apparatus for calcining a feed material comprising:
a calciner;
at least one burner positioned adjacent to an inlet portion of the calciner such that solid feed material fed into the calciner is passable through at least one flame formed in the calciner via the burner for calcination of the solid feed material, the calciner and the at least one burner arranged and positioned so that the solid feed material is passable through the at least one flame to an outlet of the calciner for calcination of the solid feed material;
wherein the calciner is connectable to at least one source of the solid feed material so that at least a portion of the solid feed material is feedable into the calciner for being passed into the flame for partial calcination in the flame in a first phase of calcination prior to being passed out of the flame and towards the outlet of the calciner for further calcination in a second phase of calcination.

12. The apparatus of claim 11, comprising:
at least one filter device connectable to the outlet of the calciner to receive the solid feed material and combustion gas from the outlet of the calciner to filter solid particulates of the solid feed material from the combustion gas.

13. The apparatus of claim 11, wherein the at least one burner and the calciner are arranged and configured so that the solid feed material has a residence time for calcination of between 5 minutes and 5 seconds, between 3 minutes and 5 seconds, between 10 seconds and 30 seconds, or between 5 seconds and 1 minute.

14. The apparatus of claim 11, wherein the at least one burner is connectable to a source of fuel, at least one source of an oxidizer, and at least one source of the solid feed material such that at least a portion of the solid feed material is feedable to the burner for being fed into the flame.

15. The apparatus of claim 11, wherein the at least one burner and the calciner are arranged and configured so that the flame facilitates calcination of the solid feed material at a pre-selected calcination temperature range of between 815° C. and 2,205° C., between 815° C. and 1,370° C., between 815° C. and 1,650° C., between 925° C. and 1,650° C. or between 925° C. and 1,370° C.

16. The apparatus of claim 11, comprising:
a carbon capture system positioned downstream of the outlet of the calciner to capture carbon dioxide from the combustion gas output from the outlet of the calciner.

17. A calcination system comprising:
a calciner having an outlet in communication with a chamber;
at least one burner connected to the calciner to form at least one flame within the chamber for calcination at a pre-selected calcination temperature range of between 815° C. and 2,205° C.;
at least one filter device connected to the outlet of the calciner to receive calcined material entrained within combustion gas from the calciner to separate the calcined material from the combustion gas; and
a carbon capture system connected to the at least one filter device to receive the combustion gas for removal of moisture from the combustion gas and capturing of carbon dioxide from the combustion gas; and
wherein a source of solid particulate feed material is connectable to the at least one burner and/or the calciner to feed the solid particulate feed material into the at least one flame for a first phase of calcination of the solid particulate feed material, the calciner sized and configured so that the solid particulate feed material passes from the flame to the outlet within the chamber of the calciner for a second phase of calcination of the feed material so that a pre-selected residence time of the solid particulate feed material for calcination to form the calcined material is greater than 5 seconds and is less than or equal to 5 minutes.

* * * * *